United States Patent [19]
Croitoru et al.

[11] Patent Number: 5,497,440
[45] Date of Patent: Mar. 5, 1996

[54] LASER BEAM WAVEGUIDE AND LASER BEAM DELIVERY SYSTEM INCLUDING SAME

[75] Inventors: Nathan Croitoru, Kfar Saba; Jacob Dror, Tel Aviv; Isaac Kaplan, Savion; Israel Gannot, Ramat Hasharon, all of Israel

[73] Assignee: Ramot University Authority For Applied Research & Industrial Development Ltd., Tel Aviv, Israel

[21] Appl. No.: 255,248

[22] Filed: Jun. 7, 1994

[30] Foreign Application Priority Data

Jun. 8, 1993 [IL] Israel ......................... 105956

[51] Int. Cl.$^6$ ......................... G02B 6/20
[52] U.S. Cl. ......................... 385/125; 385/128
[58] Field of Search ......................... 606/17, 18, 14, 606/15, 7; 385/125–128

[56] References Cited

U.S. PATENT DOCUMENTS

| | | | |
|---|---|---|---|
| 3,436,141 | 4/1969 | Comte | 385/125 |
| 3,821,510 | 6/1974 | Muncheyan | 385/119 |
| 3,843,865 | 10/1974 | Nath | 385/125 |
| 4,076,378 | 2/1978 | Cole | 385/115 |
| 4,389,091 | 6/1983 | Lidholt | 385/64 |
| 4,517,973 | 5/1985 | Sunago | 606/16 |
| 4,537,193 | 8/1985 | Tanner | 606/15 |
| 4,538,609 | 9/1985 | Takenaka | 606/16 |
| 4,564,011 | 1/1986 | Goldman | 606/15 |
| 4,607,911 | 8/1986 | Rhodes | 385/86 |
| 4,645,297 | 2/1987 | Yoshihara et al. | 385/128 |
| 4,652,083 | 3/1987 | Laakmann | 350/96.32 |
| 4,688,892 | 8/19870 | Laakmann | 35/96.32 |
| 4,688,893 | 8/1987 | Laakmann | 350/96.32 |
| 4,715,678 | 12/1987 | Johnson et al. | 385/128 |
| 4,726,647 | 2/1988 | Kakii et al. | 385/60 |
| 4,830,462 | 5/1989 | Karny | 385/125 |
| 4,849,859 | 7/1989 | Nagasawa | 362/32 |
| 4,913,505 | 4/1990 | Levy | 350/96.10 |
| 4,930,863 | 6/1990 | Croitoriu et al. | 385/125 |
| 5,058,987 | 10/1991 | Hosoya | 385/128 |
| 5,139,495 | 8/1992 | Daikuzono | 606/17 |
| 5,320,904 | 6/1994 | Mitchell | 385/128 |

FOREIGN PATENT DOCUMENTS

| | | | |
|---|---|---|---|
| 679779 | 4/1930 | France . | |
| 2-66501 | 3/1990 | Japan | 385/125 |

OTHER PUBLICATIONS

Miyagi et al., Electronic Letters, May 12, 1977, vol. 13, No. 10, pp. 274–275.

*Primary Examiner*—Rodney B. Bovernick
*Assistant Examiner*—John Ngo
*Attorney, Agent, or Firm*—Ladas & Parry

[57] ABSTRACT

A laser beam waveguide particularly useful for transmitting infrared laser radiation includes a flexible, hollow plastic tube; a metal layer on the inner surface of the hollow plastic tube; a thin dielectric film on the inner surface of the metal layer; and a flexible layer over the outer surface of the hollow plastic tube capable of absorbing infrared radiation and preventing kinking of the hollow plastic tube.

19 Claims, 1 Drawing Sheet

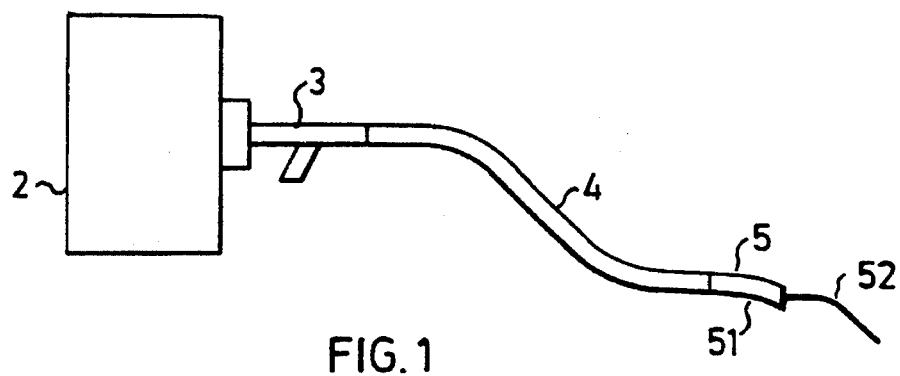
FIG. 1
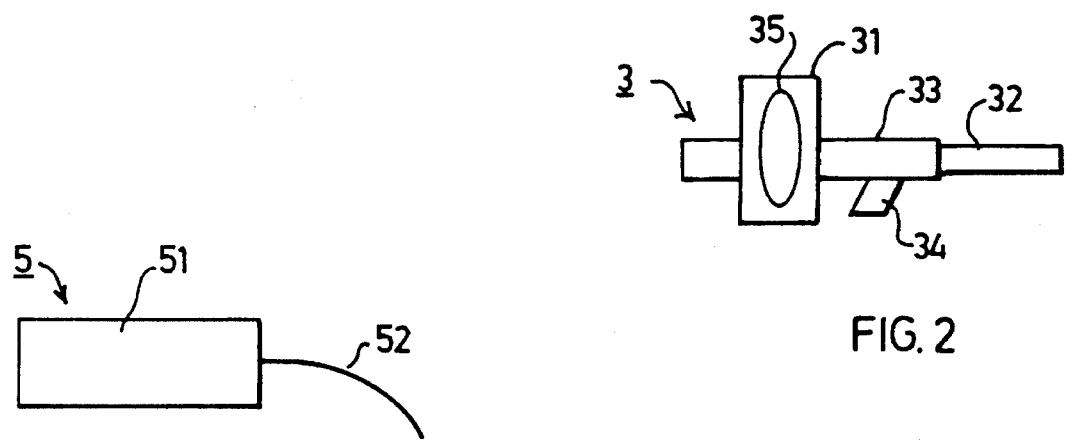
FIG. 2
FIG. 3
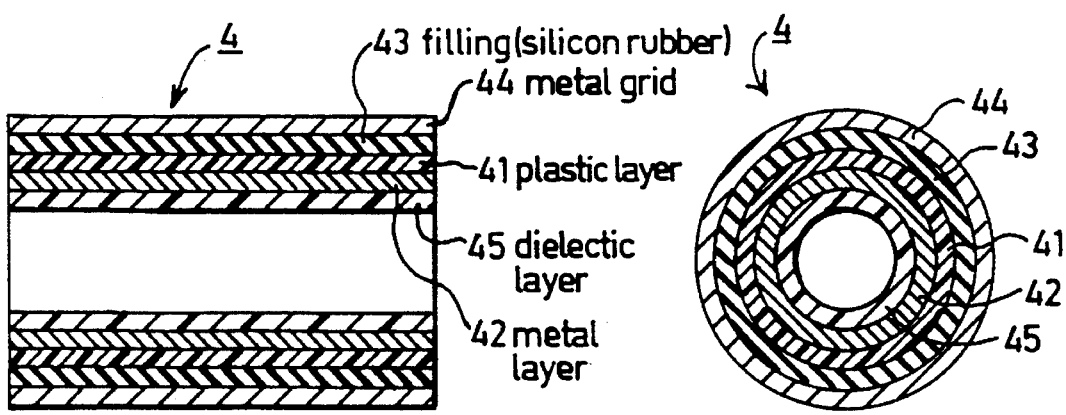
FIG. 4
FIG. 5

LASER BEAM WAVEGUIDE AND LASER BEAM DELIVERY SYSTEM INCLUDING SAME

FIELD AND BACKGROUND OF THE INVENTION

The present invention relates to a laser beam waveguide, and also to a laser beam delivery system utilizing such a waveguide for material evaporation, ablation, cutting, welding, etc. The invention is especially useful in surgical laser systems, and is therefore described below with respect to such a system.

The current surgical lasers generally deliver the laser beam, typically of infrared radiation, via an articulated arm assembly which includes joints permitting three-dimensional movements, and mirrors at the joints to direct the laser beam coaxially into the arms in all positions of the arms. Such articulated-arm systems, however, involve high initial and maintenance costs, are very bulky, take up a considerable amount of space, and are awkward to manipulate by the surgeon.

Prior U.S. Pat. No. 4,930,863, assigned to the same assignee as the present application, discloses a hollow fiber waveguide and method of making the waveguide useful for transmitting high amounts of energy in the infrared region.

OBJECTS AND BRIEF SUMMARY OF THE INVENTION

An object of the present invention is to provide a laser beam waveguide, similar to that described in U.S. Pat. No. 4,930,863, particularly useful for transmitting infrared laser radiation, and therefore making it especially suitable for use in a laser beam delivery system which does not require an articulated-arm assembly.

According to the present invention, there is provided a laser beam waveguide particularly useful for transmitting infrared laser radiation, comprising: a flexible, hollow plastic tube; a metal layer on the inner surface of the hollow plastic tube; a dielectric film on the inner surface of the metal layer; and a flexible layer over the outer surface of the hollow plastic tube capable of absorbing infrared radiation and preventing kinking of the hollow plastic tube.

According to further features in the preferred embodiment of the invention described below, the flexible layer is preferably of a silicone rubber; also, the waveguide preferably further includes a flexible metal sheath over the outer surface of the flexible insulating layer, which flexible metal sheath has a darkened outer surface to prevent reflection of stray radiation.

According to another aspect of the present invention, there is provided a laser beam delivery system comprising the novel laser beam waveguide including the above features; a rigid coupling tube having an inlet end connectible to a laser beam source, and an outlet end connected to the proximal end of the laser beam waveguide; and a handpiece attached to the distal end of the laser beam waveguide for directing the laser beam to a desired working area.

According to still further features, the rigid coupling tube includes a gas inlet for inletting a cooling gas, which gas is directed through the rigid coupling tube and the hollow plastic waveguide through its distal end onto the working area. It may also include a lens for focussing the laser beam from the laser beam source into the proximal end of the hollow plastic waveguide.

According to a still further feature in the described preferred embodiment, the handpiece includes a deformable extension capable of being manually reshaped to support the outlet end of the handpiece in the desired working area.

Further features and advantages of the invention will be apparent from the description below.

BRIEF DESCRIPTION OF THE DRAWINGS

The invention is herein described, by way of example only, with reference to the accompanying drawings, wherein:

FIG. 1 illustrates one form of laser beam delivery system constructed in accordance with the present invention;

FIG. 2 illustrates the adaptor assembly in the system of FIG. 1;

FIG. 3 illustrates the handpiece in the system of FIG. 1;

FIG. 4 is a longitudinal sectional view more particularly illustrating the construction of the hollow waveguide in the system of FIG. 1;

and FIG. 5 is a transverse sectional view of the hollow laser waveguide of FIG. 4.

DESCRIPTION OF PREFERRED EMBODIMENTS

The laser beam delivery system illustrated in FIG. 1 comprises a laser 2, an adaptor assembly 3, a hollow laser beam waveguide 4 coupled at one end by adaptor assembly 3 to the laser 2, and a handpiece 5 carried at the opposite end of the hollow laser beam waveguide 4. Laser 2 may be a source of infrared radiation, such as produced by a $CO_2$ or Er-YAG laser (or a He—Ne aiming laser), as now being extensively used in surgical operations, as well as in material processing (e.g., cutting and welding equipment).

Adaptor assembly 3 is more particularly illustrated in FIG. 2. It includes, at one end, a fitting 31 for coupling to the laser 2, and at the opposite end, a rigid tube 32 coupled to the proximal end of the hollow laser beam waveguide 4. Waveguide 4 may also be inserted into rigid tube 32. The adaptor assembly 3 further includes a gas fitting 33 between the coupling fitting 31 and the rigid tube 32. Coupling fitting 33 is formed with a gas inlet 34 for inletting a cooling gas, which gas is directed through the hollow laser beam waveguide 4 onto the working area at the distal end of the waveguide.

The rigid tube 32 is at least 10 cm in length. It is intended to prevent producing a sharp bend at the proximal end of the hollow laser beam waveguide 4 attached to the adaptor assembly or inserted into it. Preferably, rigid coupling tube 32 is from 10 to 20 cm in length.

The coupling fitting 31 preferably includes a lens 35 for focussing the laser beam from the laser beam source 2 into the proximal end of the hollow laser beam waveguide 4.

The structure of the hollow laser beam waveguide 4 is more particularly illustrated in FIGS. 4 and 5. It includes a flexible, hollow plastic tube 41; a thin metal layer 42 on the inner surface of the hollow plastic tube; and a flexible insulating layer 43 on the outer surface of the hollow plastic tube 41. Preferably, the flexible, hollow plastic tube 41 is of a fluoroethylene polymer, such as polytetrafluoroethylene, but it could be, for example, one of the other materials mentioned in above-cited U.S. Pat. No. 4,930,863. A preferred material is "Teflon" (Reg. TM of Dupont).

The flexible layer 43 over the hollow plastic tube 41 should be of a material capable of absorbing infrared radiation and should prevent kinking of the hollow plastic tube. A preferred material for this layer is silicone rubber.

The hollow laser beam waveguide 4 further includes a flexible metal sheath 44 over the outer surface of the flexible insulating layer 43. Metal sheath 44 has a darkened outer surface, e.g., black paint, to prevent reflection of stray radiation. This metal sheath may be, for example, a flexible metal braid, or a flexible metal spiral.

The thin metal layer 42 on the inner surface of the hollow plastic tube 41 is preferably of silver, as described in prior U.S. Pat. No. 4,930,863. In that case, the thin dielectric film 45 on the inner surface of the metal layer 42 is preferably a silver halide, such as silver iodide, and is preferably applied according to the chemical processes described in that patent.

The handpiece 5 carried at the distal end of the hollow laser beam waveguide 4 is grasped by the surgeon, or other user of the laser beam delivery system, for directing the laser beam to the desired working area. As shown in FIG. 3, it includes a graspable handle 51, and a deformable extension 52 capable of being manually reshaped (i.e., bent) to support the outlet end of the handpiece in the desired working area.

While the invention has been described with respect to one preferred embodiment, it will be appreciated that many variations, modifications and other applications of the invention may be made.

What is claimed is:

1. A laser beam waveguide particularly useful for transmitting infrared laser radiation, comprising:

a flexible, hollow plastic tube;

a metal layer on the inner surface of said hollow plastic tube;

a dielectric film on the inner surface of said metal layer;

a flexible layer over the outer surface of said hollow plastic tube capable of absorbing infrared radiation and preventing kinking of the hollow plastic tube;

and a flexible metal sheath over the outer surface of said flexible layer.

2. The laser beam waveguide according to claim 1, wherein said flexible layer is of a silicone rubber.

3. The laser beam waveguide according to claim 1, wherein said flexible metal sheath has a darkened outer surface to prevent reflection of stray radiation.

4. The laser beam waveguide according to claim 1, wherein said flexible metal sheath is a metal braid.

5. The laser beam waveguide according to claim 1, wherein said flexible metal sheath is a metal spiral.

6. The laser beam waveguide according to claim 1, wherein said metal layer on the inner surface of the hollow plastic tube is of a silver halide.

7. A laser beam delivery system, comprising:

a laser beam waveguide according to claim 1, having a proximal end and a distal end;

a rigid coupling tube having an inlet end connectible to a laser beam source, and an outlet end connected to the proximal end of said laser beam waveguide;

and a handpiece attached to said distal end of the laser beam waveguide for directing the laser beam to a desired working area.

8. The laser beam delivery system according to claim 7, wherein said rigid coupling tube is at least 10 cm in length.

9. The laser beam delivery system according to claim 7, wherein said rigid coupling tube is 10–20 cm in length.

10. The laser beam delivery system according to claim 7, wherein said rigid coupling tube includes a gas inlet for inletting a cooling gas, which gas is directed through the rigid coupling tube and the hollow plastic waveguide through the distal end thereof onto the working area.

11. The laser beam delivery system according to claim 7, wherein said rigid coupling tube includes a lens for focussing the laser beam from the laser beam source into the proximal end of the hollow plastic waveguide.

12. The laser beam delivery system according to claim 7, wherein said handpiece includes a deformable extension capable of being manually reshaped to support the outlet end of the handpiece in the desired working area.

13. A laser beam waveguide particularly useful for transmitting infrared laser radiation, comprising:

a flexible, hollow plastic tube;

a metal layer on the inner surface of said hollow plastic tube;

a dielectric film on the inner surface of said metal layer;

and a flexible layer over the outer surface of said hollow plastic tube capable of absorbing infrared radiation and preventing kinking of the hollow plastic tube;

said hollow plastic tube being of a fluoroethylene polymer.

14. The laser beam waveguide according to claim 13, wherein said metal layer on the inner surface of the hollow plastic tube is of silver.

15. The laser beam waveguide according to claim 14, wherein said dielectric film is a silver halide.

16. A laser beam waveguide particularly useful for transmitting infrared laser radiation, comprising:

a hollow plastic tube;

a metal layer on the inner surface of said hollow plastic tube;

a dielectric film on the inner surface of said metal layer;

an insulating layer over the outer surface of said hollow plastic tube capable of absorbing infrared radiation and preventing kinking of the hollow plastic tube;

and a metal sheath over the outer surface of said insulating layer.

17. The laser beam waveguide according to claim 16, wherein said insulating layer is of a silicone rubber.

18. The laser beam waveguide according to claim 16, wherein said metal sheath has a darkened outer surface to prevent reflection of stray radiation.

19. The laser beam waveguide according to claim 16, wherein said hollow plastic tube is of a fluoroethylene polymer.

* * * * *